3,354,803
HOUSING FOR PHOTOGRAPHIC CAMERAS
Alfred Winkler, Munich, Dieter Engelsmann and Franz Landbrecht, Unterhaching, Munich, and Karl Bammesberger, Munich, Untermenzing, Germany, assignors to Agfa Aktiengesellschaft, Leverkusen, Germany
Filed Feb. 24, 1965, Ser. No. 434,995
Claims priority, application Germany, Mar. 28, 1964, A 45,619
3 Claims. (Cl. 95—11)

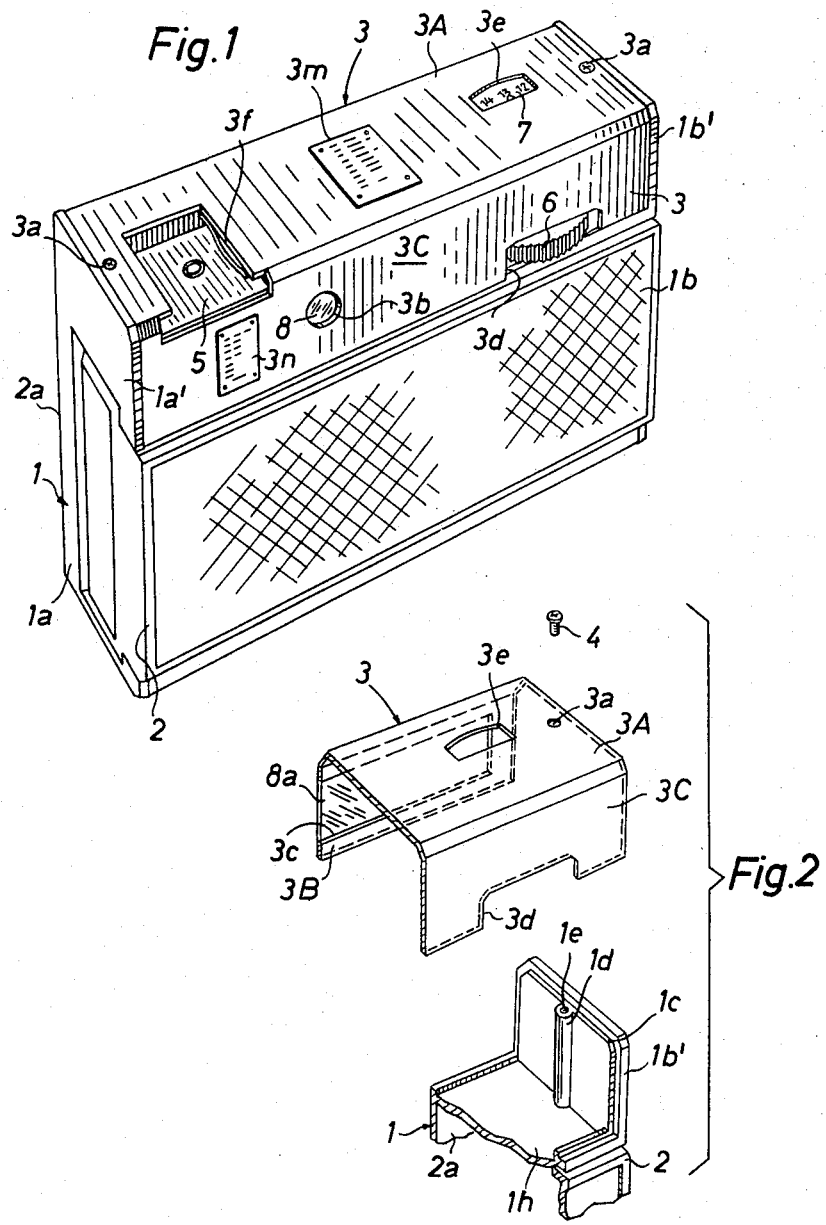

ABSTRACT OF THE DISCLOSURE

The housing of a camera resembles a box and comprises a lower part having two end walls portions of which extend upwardly beyond the front and rear walls, and a U-shaped upper part having a top panel and two depending panels and forming an enclosure between the upwardly extending portions of the end walls. The lower part consists of synthetic plastic material and the upper part consists of sheet metal.

---

The present invention relates to photographic cameras, and more particularly to an improved camera housing. Still more particularly, the invention relates to a composite camera housing.

The upper parts of housings for photographic cameras normally consist of drawn metal. The upper part includes the upper portions of the four side walls and the top wall of the housing. Such methods of making the housing are rather expensive and result in a large number of rejects because the metal often develops fissures and/or zones of high stress concentration.

Accordingly, it is an important object of the present invention to provide a very simple, comparatively inexpensive and eye-pleasing housing for photographic cameras which may be mass-produced by resorting to methods and processes resulting in a minimal number of rejects, which may be mass-produced of readily available and rather inexpensive materials, and which may be produced in many different sizes and/or shapes.

Another object of the invention is to provide a housing of the just outlined characteristics which may be readily taken apart or reassembled, whose parts may be provided with any desired number of openings, cutouts, recesses, depressions and similar apertures to allow for convenient observation and/or manipulation of various components, and which provides ample space for the application or impression of tables, instructions, advertising matter or other indicia.

A further object of the invention is to provide a novel upper part for the housing of a photographic camera.

An additional object of the invention is to provide an upper part which can be mass-produced in conventional machinery.

A concomitant object of the invention is to provide a novel lower part for the housing of a photographic camera.

Still another object of the invention is to provide a camera housing which consists of a small number of parts.

Briefly stated, one feature of our present invention resides in the provision of a camera housing which comprises a lower part preferably consisting of a single piece of rigid synthetic plastic material, and a substantially U-shaped upper part preferably consisting of a single piece of suitably deformed metallic sheet material. The lower part comprises a first pair of upstanding side walls constituting the end walls and a second pair of upstanding side walls respectively constituting the front and rear walls of this lower part. The upper edge portions of one pair of walls are preferably located at the same horizontal level and the walls of the other pair have substantially rectangular projections extending upwardly and beyond the top level of the one pair of walls. The upper part is detachably fastened to the lower part and comprises a top panel which extends between the horizontal top edges of the upwardly extending portions, and two depending panels which extend between the vertical side edges of the upwardly extending portions so that the upper part forms an enclosure around the space extending between such upwardly extending portions.

The novel features which are considered as characteristic of the invention are set forth in particular in the appended claims. The improved housing itself, however, both as to its construction and the mode of assembling the same, together with additional features and advantages thereof, will be best understood upon perusal of the following detailed description of a specific embodiment with reference to the accompanying drawings, in which:

FIG. 1 is a perspective view of a photographic camera whose housing is constructed and assembled in accordance with our invention; and FIG. 2 is an exploded perspective view of a portion of the housing.

Referring to the drawings, there is shown a candid camera comprising a substantially box-shaped housing including a lower part 1 and an upper part 3. The lower part 1 comprises four upstanding side walls including a pair of end walls 1a, 1b and a second pair of walls 2, 2a respectively constituting the rear and front walls of the part 1. This part consists of a single piece of rigid synthetic plastic material, and its wall thickness normally exceeds the wall thickness of the upper part 3 which resembles an inverted U-shaped body and comprises a top panel 3A and two depending panels 3B, 3C. The top part 3 preferably consists of a single piece of sheet metal which is formed by stamping a blank from a flat plate and is thereupon shaped in a suitable upsetting machine or the like adapted to bend the panels 3B, 3C into planes which are substantially normal to the plane of the top panel 1A.

An important feature of the present invention resides in such construction of the end walls 1a, 1b that each thereof comprises a substantially rectangular portion 1a', 1b' which extends upwardly and beyond the horizontal top edge portions of the front and rear walls 2a, 2. The space between the rectangular portions 1a', 1b' is fully enclosed by the upper part 3 when the latter is detachably secured to the lower part 1. As shown in FIG. 2, the connection between the parts 1, 3 may comprise fasteners in the form of screws 4 which extend through apertures 3a provided in the top panel 3A and registering with the bores 1e of vertically extending tapped sleeves 1d provided at the inner sides of the rectangular end wall portions 1a', 1b'. Other types of fasteners may be employed if desired.

The vertical side edges and the horizontal top edges of the upwardly extending portions 1a', 1b' are formed with recesses or channels 1c which receive the adjacent marginal portions of the panels 3A–3C when the upper part 3 is properly fastened to the lower part 1. The outer sides of the panels 3A–3C are then flush with the corresponding end faces of the portions 1a', 1b'. Alternatively, the marginal portions of the panels 3A–3C may straddle the corresponding end faces of the portions 1a', 1b so that all sides but the outer side of each of these portions will be fully surrounded by the upper part 3.

As shown in FIG. 2, the recesses 1c may also extend into the horizontal upper edge portions of the front and rear walls 2a, 2 so that the upper part 3 will be located entirely within the confines of the lower part 1.

In stamping or otherwise machining the upper part 3, the panels 3A–3C are preferably provided with depressions and/or cutouts which serve to accommodate and/or to afford access to various components of the camera. For example, the depending rear panel 3C may be formed with a first cutout in the form of an open slot 3d serving to accommodate a portion of a knurled knob 6 which forms part of the film transporting mechanism, and with a second cutout in the form of a circular observation opening 3b. This opening 3b actually forms a window and accommodates a magnifying lens 8 or a transparent pane of vitreous or synthetic plastic material enabling the operator to view the object which is to be photographed, to observe the position of a pointer, frame finder, scale or marker which is provided in the space surrounded by the upper part 3, or to observe another component of the camera. The knob 6 may be replaced with a film transporting lever a portion of which then extends through the cutout 3d.

The top panel 3a is provided with a cutout 3e in the form of a closed slot which also accommodates a transparent or translucent pane provided with a marker registering with one of a series of numerals on an exposure counter wheel 7. The top panel 3a is further provided with a rectangular cutout 3f which accommodates an accessory clip 5 serving to receive the shoe of a range finder, a view finder or the like.

FIG. 2 shows that the front panel 3B is provided with an elongated cutout 3c which receives a transparent pane 8a and forms a window located in front of the light-sensitive element of an exposure meter or another element of the camera.

It is clear that the horizontal partition 1h of the lower part 1 or the portions 1a', 1b' normally carry suitable brackets, ribs or other types of detachable or integrally formed holders to support all such components whose position and/or operation may be observed through the cutouts provided in the panels 3A–3C. For example, the space between the end wall portions 1a', 1b' may accommodate a view finder which can be attached to the part 1 or 3. It is also clear that the improved camera housing may be modified in a number of ways without departing from the spirit of our invention; for example, the end walls 1a, 1b may terminate at the level of the partition 1h and the walls 2, 2a may extend above and beyond the partition 1h. In such modified housing, the depending panels of the upper part will correspond to the portions 1a', 1b' and the upwardly extending portions of the front and rear walls will correspond to the panels 3B, 3C. The upwardly extending portions of the front and rear walls are then provided with cutouts corresponding to the cutouts in the panels 3B, 3C.

The rear wall 2 is movable with respect to or is fully detachable from the remainder of the lower part 1 so that the user may gain access to the chambers which accommodate the film cartridges. In its illustrated position, the rear wall 2 is detachably and sealingly affixed to the remainder of the lower part 1 by a locking mechanism of conventional design, not shown in the drawings. The outer side of at least one of the panels 3A–3C may be provided with inscriptions indicating the name of the manufacturer, the type of camera, tables which are of assistance to the photographer and/or other indicia. FIG. 1 shows, merely by way of example, two plaques marked 3m, 3n which are provided with tables (e.g., flash exposure guide members, outdoor exposure guide numbers, etc.) and are respectively secured to the outer sides of the panels 3A, 3C. Instead of such plaques, the indicia may be engraved directly into the material of the upper part 3. It is obvious that additional indicia may be provided on the side walls of the lower part 1.

A very important advantage of the improved housing is that it may be produced at a cost which is but a fraction of the cost of many conventional camera housings wherein the upper part is either integral with the lower part or is produced by resorting to a drawing method or to expensive molds.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be secured by Letters Patent is:

1. In a camera, a housing comprising a lower part arranged to accommodate the film and at least a portion of the film transporting mechanism, said lower part having a first pair of side walls constituting the end walls and a second pair of side walls respectively constituting the front and rear walls thereof, the walls of one of said pairs having portions extending upwardly beyond the other pair of walls and defining between themselves a space; at least one camera component provided in said space; and a substantially U-shaped upper part having a top panel and a pair of depending panels, said second part forming an enclosure around said space between said upwardly extending portions, at least one panel of said top part having a window exposing a portion of said component.

2. In a camera, a portable housing comprising a lower part arranged to accommodate the film and at least a portion of the film transporting mechanism, said lower part having a first pair of side walls constituting the end walls and a second pair of side walls respectively constituting the front and rear walls thereof, said side walls having portions extending upwardly beyond said front and rear walls and defining between themselves a space; at least one camera component provided in said space; and a substantially U-shaped upper part having a top panel and a pair of depending panels, said second part forming an enclosure around said space between the upwardly extending portions of said side walls, at least one panel of said top part having a window exposing a portion of said component.

3. In a camera, a portable housing comprising a lower part arranged to accommodate the film and at least a portion of the film transporting mechanism, said lower part having a first pair of side walls constituting the end walls and a second pair of side walls respectively constituting the front and rear walls thereof, the walls of one of said pairs having portions extending upwardly beyond the other pair of walls and defining between themselves a space; at least one camera component provided in said space; and a substantially U-shaped upper part consisting of sheet metal, said upper part forming an enclosure around said space between said upwardly extending portions and having a top panel and a pair of bent-over depending panels, at least one panel of said top part having a window exposing a portion of said component.

(References on following page)

References Cited

UNITED STATES PATENTS

| | | | |
|---|---|---|---|
| 552,633 | 1/1896 | Esmond | 95—31 |
| 1,929,218 | 10/1933 | Sambleson | 220—3.94 |
| 2,741,390 | 4/1956 | Moore | 220—4 |
| 2,876,340 | 3/1959 | Williams | 240—41.55 |
| 2,932,242 | 4/1960 | Greger | 95—11 |
| 2,985,748 | 5/1961 | Mendelsohn | 240—1.3 |
| 3,066,588 | 12/1962 | Hell | 95—11 |
| 3,210,532 | 10/1965 | Woofter et al. | 240—41.55 |

FOREIGN PATENTS

| | | |
|---|---|---|
| 1,182,518 | 11/1964 | Germany. |
| 840,475 | 7/1960 | Great Britain. |

JOHN M. HORAN, *Primary Examiner.*

NORTON ANSHER, *Examiner.*

FRED BRAUN, *Assistant Examiner.*